UNITED STATES PATENT OFFICE.

JOHANN CARL WILHELM FERDINAND TIEMANN, OF BERLIN, GERMANY, ASSIGNOR TO HAARMANN & REIMER, OF HOLZMINDEN, GERMANY.

PROCESS OF MAKING AROMATIC KETONES.

SPECIFICATION forming part of Letters Patent No. 583,719, dated June 1, 1897.

Application filed October 16, 1893. Serial No. 488,321. (No specimens.) Patented in France April 27, 1893, No. 229,683; in England May 1, 1893, No. 8,736, and September 18, 1893, No. 17,539; in Germany September 8, 1893, No. 75,120, and in Belgium September 23, 1893, No. 106,520.

*To all whom it may concern:*

Be it known that I, JOHANN CARL WILHELM FERDINAND TIEMANN, (coproprietor of the firm of Haarmann & Reimer, of Holzminden,) a subject of the King of Prussia, residing at Berlin, in the Kingdom of Prussia and Empire of Germany, have invented new and useful improvements in processes of manufacturing smelling substances from citral and the homologues of the acetones, and also from acetone and citronellone, (citronellal,) (for which I have obtained Letters Patent in Germany, No. 75,120, dated September 8, 1893; in Belgium, No. 106,520, dated September 23, 1893; in England, No. 8,736, dated May 1, 1893, and No. 17,539, dated September 18, 1893; in France, No. 229,683, dated April 27, 1893, with additional patent dated September 18, 1893,) of which the following is a specification.

My invention has reference to a process for the production of fragrant ketones, and particularly to improvements in the process described in my prior application, Serial No. 473,852, dated May 11, 1893, (now United States Letters Patent No. 556,943,) which latter process consists in condensing acetone and the citral naturally occurring in lemon-oil, lemon-grass oil, &c., to a new ketone. My present process relates to the production of a new ketone from artificial citral obtained by the oxidation of alcohols and having the formula $C_{10}H_{18}O$. This citral is present in many volatile oils and such alcohols as geraniol, rodinol, linaool, aurantiol, lavendol, &c. I have also found that in place of the natural citrals, citrals treated with weak condensing agents may be used, which according to the explanation given in my application for Letters Patent, Serial No. 488,322, filed October 16, 1893, (now United States Letters Patent No. 586,944,) probably contain an isomer of the citral. I have also found that the acetone may be substituted by the homologues of the same, such as ethyl-methyl ketone, without essentially changing the properties of the product as far as its industrial application is concerned. In order that the exact relation of the two classes of substances which enter into the reaction may be better understood, it may be here stated that the citrals belong to the class of aldehydes.

In carrying out my process I proceed as follows: Equal parts of citral and ethyl-methyl ketone are shaken together with dilute soda-lye for several days. The product of the reaction is taken up in ether and freed from the latter by heating it in a water-bath and then separated by distillation in a steam-current from the unattacked citral, the unchanged ethyl-methyl ketone, and the volatile products of condensation of the latter. The oil remaining in the distilling apparatus is distilled over *in vacuo*, and the ketone, which I have termed the "methyl-pseudo-ionone," passes over under a pressure of 21.5 millimeters at a temperature of from 160° to 175° centigrade. The methyl-pseudo-ionone has a peculiar but not very pronounced odor, and is converted by digestion with dilute acids, say three per cent. sulfuric acid at a temperature of about 102° centigrade, into an isomeric ketone, which I term "methyl-ionone." This ketone boils under a pressure of twenty-four millimeters at a temperature of from 155° to 160° centigrade. The odor of methyl-ionone resembles that of violets, or of the ketone now known as "ionone." The condensation of the ethyl-methyl ketone with citral takes place somewhat slower than that of acetone with citral. The higher homologues of acetone may be condensed with citral in a similar manner, but with such homologues the condensation requires a still longer time. The methyl-ethyl, &c., ionones are intended for use in perfumery and as aromatics in food.

What I claim as new is—

The herein-described process for the manufacture of fragrant ketones consisting in treating citral and the homologues of acetone with an alkaline condensing agent to form new ketones (methylized, ethylized, &c., ketones) and then converting said ketones, by means of acids, into ketones isomeric with said ketones first formed.

In testimony whereof I have signed my name to this specification in the presence of two subscribing witnesses.

JOHANN CARL WILHELM FERDINAND TIEMANN.

Witnesses:
GUSTAV HÜLSMANN,
CARL MÜLLER.